(12) United States Patent
Shimada et al.

(10) Patent No.: US 9,446,750 B2
(45) Date of Patent: Sep. 20, 2016

(54) VALVE SYSTEM OF BRAKING DEVICE

(71) Applicants: HONDA MOTOR CO., LTD., Minato-ku, Tokyo (JP); NISSIN KOGYO CO., LTD., Ueda-shi, Nagano (JP)

(72) Inventors: Takashi Shimada, Wako (JP); Hiroaki Tokoi, Ueda (JP); Takaaki Komaba, Ueda (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 14/493,543

(22) Filed: Sep. 23, 2014

(65) Prior Publication Data

US 2015/0084401 A1    Mar. 26, 2015

(30) Foreign Application Priority Data

Sep. 25, 2013  (JP) ................................. 2013-197657

(51) Int. Cl.
*B60T 11/28* (2006.01)
*B60T 7/04* (2006.01)
(Continued)

(52) U.S. Cl.
CPC ................. *B60T 11/28* (2013.01); *B60T 7/042* (2013.01); *B60T 8/36* (2013.01); *B60T 8/363* (2013.01); *B60T 8/4081* (2013.01); *B60T 11/103* (2013.01)

(58) Field of Classification Search
CPC .......... B60T 11/10; B60T 11/28; B60T 8/34; B60T 8/3655
USPC ............................ 303/119.1, 119.2; 361/154
See application file for complete search history.

(56) References Cited

U.S. PATENT DOCUMENTS 4,492,913 A * 1/1985 Arnold .................... F02D 41/20
                                                 123/472
6,208,498 B1 * 3/2001 Ueda .................... F16H 61/0251
                                                  361/154
(Continued)

FOREIGN PATENT DOCUMENTS

CA       2 829 745         9/2012
DE   10 2005 046 055 A1    3/2007
(Continued)

OTHER PUBLICATIONS

ESSR issued on Nov. 5, 2014 in the corresponding EP Patent Application 14186136.9.
(Continued)

*Primary Examiner* — Robert A Siconolfi
*Assistant Examiner* — James Hsiao
(74) *Attorney, Agent, or Firm* — Carrier Blackman & Associates, P.C.; William D. Blackman; Joseph P. Carrier

(57) ABSTRACT

A valve system of a braking device provided with a stroke simulator that is connected via a connection passage with a pipe for making a master cylinder communicate with a wheel cylinder; and a third shut-off valve that is a solenoid valve and performs opening and closing of a communication between the master cylinder and the stroke simulator, wherein the third shut-off valve is a normally closed valve; and the valve system opens the third shut-off valve by applying a start-up voltage, thereafter keeps the open state of the third shut-off valve by alternately applying a holding voltage that is lower than the start-up voltage and the start-up voltage, in order to prevent heat generated in the valve from becoming excessively high even while keeping the open state of the valve.

12 Claims, 7 Drawing Sheets

(51) Int. Cl.
  *B60T 11/10* (2006.01)
  *B60T 8/36* (2006.01)
  *B60T 8/40* (2006.01)

(56) References Cited

U.S. PATENT DOCUMENTS

| | | | | |
|---|---|---|---|---|
| 6,560,088 B1* | 5/2003 | Beck | ............... | F01L 9/04 |
| | | | | 251/129.01 |
| 6,676,230 B2* | 1/2004 | Kuno | ............... | B60T 8/36 |
| | | | | 303/114.3 |
| 7,167,784 B2* | 1/2007 | Koerner | ............... | B60T 8/36 |
| | | | | 701/33.9 |
| 7,350,882 B2* | 4/2008 | Kamiya | ............... | B60T 7/065 |
| | | | | 303/157 |
| 7,992,947 B2* | 8/2011 | Kaestner | ............... | B60T 8/36 |
| | | | | 303/119.2 |
| 8,733,849 B2* | 5/2014 | Tanaka | ............... | B60T 8/3655 |
| | | | | 303/116.2 |
| 9,043,109 B2* | 5/2015 | Romero | ............... | B60T 8/3275 |
| | | | | 701/70 |
| 2005/0275286 A1* | 12/2005 | Ohmori | ............... | B60T 8/4072 |
| | | | | 303/155 |
| 2010/0219026 A1* | 9/2010 | Fukasawa | ............... | B60T 8/4081 |
| | | | | 188/72.1 |
| 2013/0197770 A1* | 8/2013 | Osaki | ............... | B60T 8/34 |
| | | | | 701/70 |

FOREIGN PATENT DOCUMENTS

| | | |
|---|---|---|
| EP | 1 363 056 A2 | 11/2003 |
| JP | H11-336935 A | 12/1999 |
| JP | 2006-017181 A | 1/2006 |
| WO | 2009/013586 A3 | 1/2009 |

OTHER PUBLICATIONS

Office Action issued in the counterpart Japanese patent application JP 2013-197657, mailed on Jul. 19, 2016, with a partial English translation thereof.

Office Action issued in the counterpart Chinese patent application 2014104905879 mailed on Jul. 1, 2016.

* cited by examiner

VALVE SYSTEM OF BRAKING DEVICE

CROSS REFERENCE TO RELATED APPLICATIONS

The present application relates to and claims priority from Japanese patent application No. 2013-197657 filed on Sep. 25, 2013, which is incorporated herein by reference in its entirety.

BACKGROUND OF THE INVENTION

1. Field of the Invention

The present invention relates to a valve system of a braking device.

2. Description of Related Art

It is known that the so-called by-wire brake used as a braking device for a vehicle is provided with a pedal force simulator to generate a pedal reaction force to a brake pedal. Specifically, in the above braking device, when the by-wire brake is in a normal status, brake fluid from a master cylinder that generates fluid pressure (oil pressure) by operation of the brake pedal is fed to a pedal force simulator by shutting off a flow passage toward a brake caliper (wheel cylinder of the caliper). In the above way, a reaction force corresponding to that of a conventional brake is generated in the pedal force simulator. On the other hand, when the by-wire brake is in an abnormal status, a backup brake is actuated by shutting off the brake fluid flowing into the pedal force simulator and the brake fluid is fed to the brake caliper. Switching between feeding and shutting off the brake fluid to the pedal force simulator is performed by switching a pedal force simulator valve that is a solenoid valve provided in the flow passage of the brake fluid between the master cylinder and the pedal force simulator.

Additionally, regarding the solenoid valve used for the braking device for a vehicle, Patent Literature 1 discloses a technique of applying an initial-operation minimum-current corresponding to an actuation force required for the initial operation to a solenoid coil within the initial operation time T1 starting from a time point of starting current, application to the solenoid coil in a solenoid valve used for a vehicle brake system. In addition, the Patent Literature 1 discloses a technique of applying an operating-state holding minimum-current corresponding to an actuation force required for holding an operating state in an operating state holding time T2 thereafter

RELATED ART LITERATURE

Patent Literature

Patent Literature 1: JP2006-017181A

SUMMARY OF THE INVENTION

Problems to be Solved by Invention

The pedal force simulator valve (hereinafter simply referred to as "valve") is a normally closed valve and opens in response to an operation such as a vehicular system start-up, an operation of a brake pedal, or the like. In the above case, as described in Patent Literature 1, the valve is able to be actuated by performing a process such as switching between the initial-actuation minimum-current and the operating-state holding minimum-current.

Specifically, for example, the solenoid coil of the valve is applied with a start-up voltage for generating an actuation force necessary to open the valve, thereafter with a holding voltage lower than the start-up voltage for generating an actuation force necessary to hold the open state of the valve. In this way, the valve is able to be opened and held as it is.

However, if the holding voltage cannot be kept due to any causes such as voltage fluctuation in applying the holding voltage to the valve, the valve is not be able to keep its open state and is closed. Because the holding voltage is kept (the start-up voltage is not applied) after the valve is closed, the valve is kept closed.

In order to prevent the above situation, it can be thought to continue applying the start-up voltage to the valve so that the valve is not closed even after the start-up voltage is applied to the valve to open the valve.

However, there is a problem that continuous application of the start-up voltage to the valve may cause the valve to generate excessively large amount of heat because the start-up voltage is high. Accordingly, it is an object of the present invention to provide a valve system of a braking device that is able to prevent the excessive heat generated in the valve even while preventing the accidental close of the valve disposed in a connection passage connected to the liquid flow passage via which the master cylinder communicates with the wheel cylinder.

Means for Solving Problems

In order to achieve the above object, one aspect of the present invention provides a valve system of a braking device provided with a valve that is a solenoid valve and disposed in a connection passage connected to a liquid flow passage via which a master cylinder communicates with a wheel cylinder; a valve-opening operation unit for performing an opening operation of the valve by applying a first operating voltage or current to the valve; and a holding operation unit for performing a holding operation for holding the open state of the valve by applying a holding voltage or current smaller than the first operating voltage or current to the valve after the valve-opening operation, wherein the master cylinder generates a fluid pressure through an operation applied to a brake pedal; the wheel cylinder generates a frictional braking force through the fluid pressure; and the holding operation unit applies to the valve a second operating voltage or current that is larger than the holding voltage or current and allows an opening operation of the valve after applying the holding voltage or current to the valve during the holding operation.

According to the present invention, the valve is prevented from being closed due to a fluctuation of a voltage or current using the second operating voltage or current, and moreover, the heat generated in the valve is prevented from increasing using the holding voltage or current, because the present invention uses the second operating voltage or current in addition to the holding voltage or current in order to hold the open state of the valve.

In the above case, the holding operation unit may apply the second operating voltage or current and the holding voltage or current so that the heat generated in the valve is equal to or less than a predetermined value during the holding operation.

According to the present invention, the heat generated in the valve is able to be equal to or less than a predetermined value.

In the above case, the holding operation unit may perform an alternate application of the second operating voltage or current and the holding voltage or current so that the heat generated in the valve is kept equal to or less than a predetermined heat amount during the holding operation.

According to the present invention, the heat generated in the valve is able to be kept equal to or less than a predetermined heat amount by means of the alternate application of the second operating voltage or current and the holding voltage or current.

In the above case, the valve system of the braking device may be further provided with a stroke simulator that communicates with the master cylinder via the liquid flow passage and generates a pedal reaction force in the operation of the brake pedal. In addition, the valve may be a normally closed valve provided between the master cylinder and the stroke simulator, and may have a valve element moving in a direction of closing the valve when the fluid pressure at the master cylinder increases.

According to the present invention, the valve for opening and closing the stroke simulator is prevented from being closed, the brake reaction force is prevented from failing to be generated, and a driver is prevented from feeling discomfort with the braking force.

In the above case, the valve system of the braking device may be further provided with a pedal sensing unit for obtaining an operation amount of the brake pedal, and the holding operation unit may apply the second operating voltage or current to the valve at an earlier time if the operation amount of the brake pedal is equal to or larger than a predetermined reference value than otherwise.

According to the present invention, the valve is prevented from being closed by applying the second operating voltage or current at an earlier time than the valve is closed, even if the operation amount of the brake pedal becomes large and the fluid pressure at the master cylinder acts in a direction of closing the valve.

In the above case, when the holding operation unit applies the second voltage or current to the valve earlier, the second voltage or current may be lower than the first voltage or current and higher than the holding voltage or current.

According to the present invention the heat generated in the valve is able to be suppressed more effectively.

Effect of the Invention

According to the present invention, a valve system of a braking device, which is able to prevent the excessive heat generated in the valve even while preventing the accidental close of the valve disposed in a connection passage connected to the liquid flow passage via which makes the master cylinder communicates with the wheel cylinder, is provided.

DETAILED DESCRIPTIONS OF INVENTION

The following describes an embodiment of the present invention with reference to the drawings.

Schematic Configuration of Braking-Force Generating System 10

Figure 1:
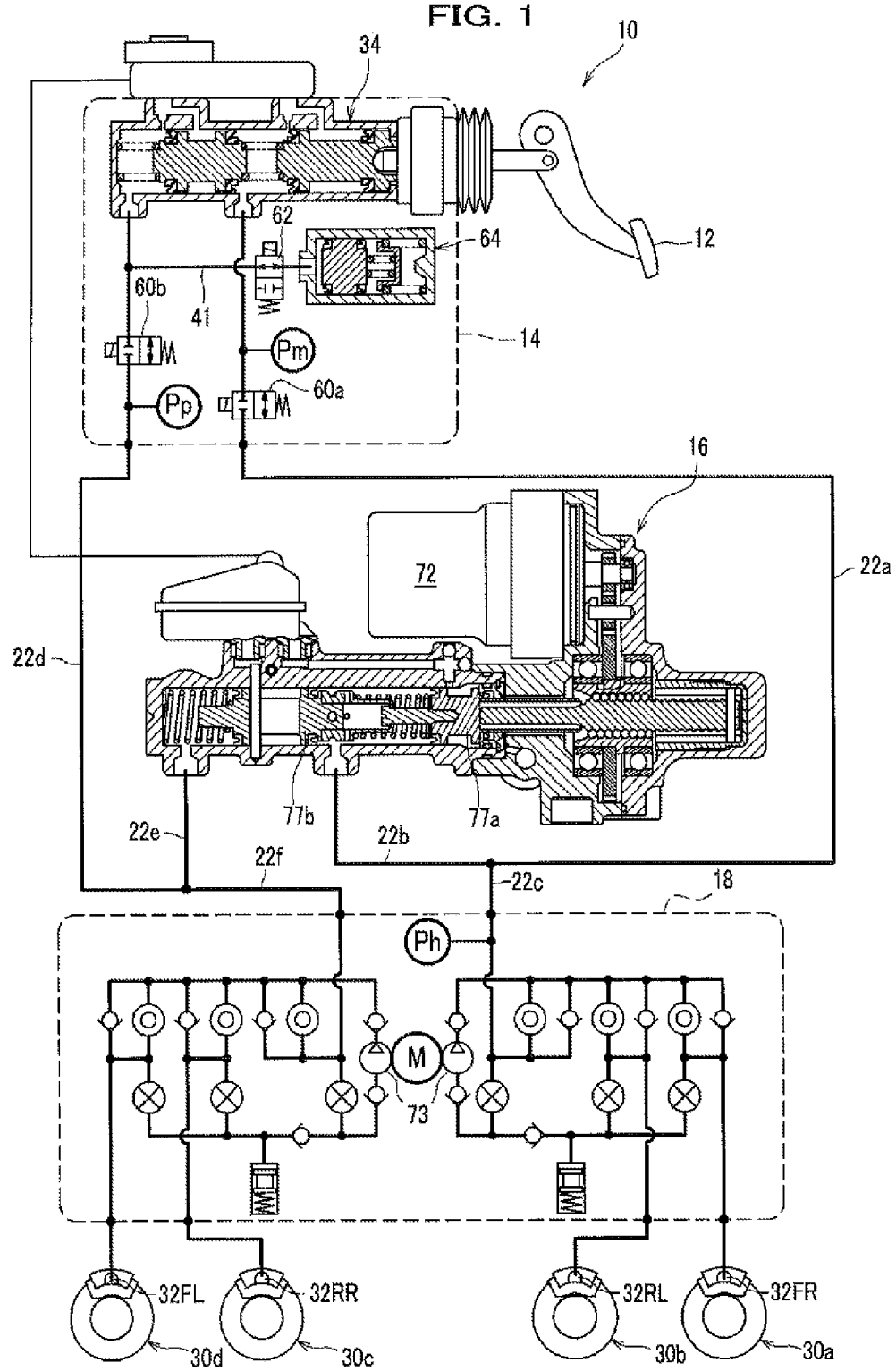
FIG. 1 is a configuration diagram showing an outline of a braking-force generating system according to an embodiment of the present invention.

FIG. 1 is a block diagram showing an outline of the braking-force generating system 10 according to the present embodiment.

The braking-force generating system 10 is a system for generating a frictional braking force of a vehicle. The braking-force generating system 10 includes an input unit 14 provided with a master cylinder 34 for converting a tread force inputted by a driver's operation of a brake pedal 12 to a brake fluid pressure; a motor cylinder unit 16 that generates a brake fluid pressure according to or regardless of the brake fluid pressure generated by the master cylinder 34; a vehicle behavior stability assist unit (VSA unit) 18, and disc brake mechanisms 30a to 30d, and the like. The motor cylinder unit 16 is provided with a first and second slave piston 77a and 77b for receiving a driving force from an electric motor 72 to generate the brake fluid pressure.

The pipes 22a to 22f are provided with brake fluid pressure sensors Pm, Pp, Ph for obtaining brake fluid pressures at respective parts. The VSA unit 18 is provided with a pump 73 for pressurizing the brake fluid.

The motor cylinder unit 16 connects to a wheel cylinder 32FR for generating a frictional braking force using fluid pressure at the disc brake mechanism 30a provided on a front-right wheel (not shown) of the vehicle; a wheel cylinder 32RL for generating a frictional braking force using fluid pressure at the disc brake mechanism 30b provided on a rear-left wheel (not shown); a wheel cylinder 32RR for generating a frictional braking force using fluid pressure at the disc brake mechanism 30c provided on a rear-right wheel (not shown); and a wheel cylinder 32FL for generating a frictional braking force using fluid pressure at the disc brake mechanism 30d provided on a front-left wheel (not shown).

Basic Operation of Braking-Force Generating System 10

Next, description is made of the basic operation of the braking-force generating system 10.

The braking-force generating system 10 activates a so-called by-wire brake system when a driver steps on the brake pedal 12 in a normal operation of a control system for controlling the motor cylinder unit 16 and the by-wire brake system. Specifically, in the braking-force generating system 10 that is in the normal operation, when a driver steps on the brake pedal 12, which is detected by a brake pedal stroke sensor 52 described below, the motor cylinder unit 16 activates the disc brake mechanisms 30a to 30d using the brake fluid pressure generated by driving the motor 72 to brake the respective wheels, in a state in which a first shut-off valve 60a and a second shut-off valve 60b block the communication of the master cylinder 34 with the disk brake mechanism 30a to 30d (wheel cylinders 32FR, 32RL, 32RR, and 32FL) for braking the respective wheels.

In addition, in the normal operation, while the first shut-off valve 60a and the second shut-off valve 60b are shut off, a third shut-off valve 62 is opened, and the brake fluid becomes to flow into a stroke simulator 64 from the master cylinder 34. Thereby, even if the first shut-off valve 60a and the second shut-off valve 60b are shut off, the brake fluid is being able to move so that the operation of the brake pedal 12 generates a stroke resulting in the generation of the pedal reaction force.

On the other hand, in an abnormal case in which the motor cylinder unit 16 or the like is inactive, the braking-force generating system 10 activates a conventional oil-pressure type of brake system when the driver steps on the brake pedal 12. Specifically, the braking-force generating system 10 in the abnormal case, if the driver steps on the brake pedal 12, makes the first shut-off valve 60a and the second shut-off valve 60b become in open states respectively, and the third shut-off valve 62 become in a closed state, thereby transmits the brake-fluid pressure generated by the master cylinder 34 to and activates the disc brake mechanisms 30a to 30d (wheel cylinders 32FR, 32RL, 32RR, and 32FL) to brake the respective wheels.

Since the configurations and operations of the other units such as the input unit 14, the motor cylinder unit 16, and the VSA unit 18 are well known, detailed descriptions thereof are omitted.

Configuration of Third Shut-Off Valve 62

The master cylinder 34 communicates with the wheel cylinders 32FR, 32RL, 32RR, and 32FL through pipes 22a and 22d that are liquid flow passages. One end of a pipe 41 is connected to a side of the pipe 22d that is nearer the master cylinder 34 than the second shut-off valve 60b, and the other end of the pipe 41 is connected to the stroke simulator 64. Further, in the intermediate portion of the pipe 41 is inserted the third shut-off valve (pedal force simulator valve) 62.

Figure 2:
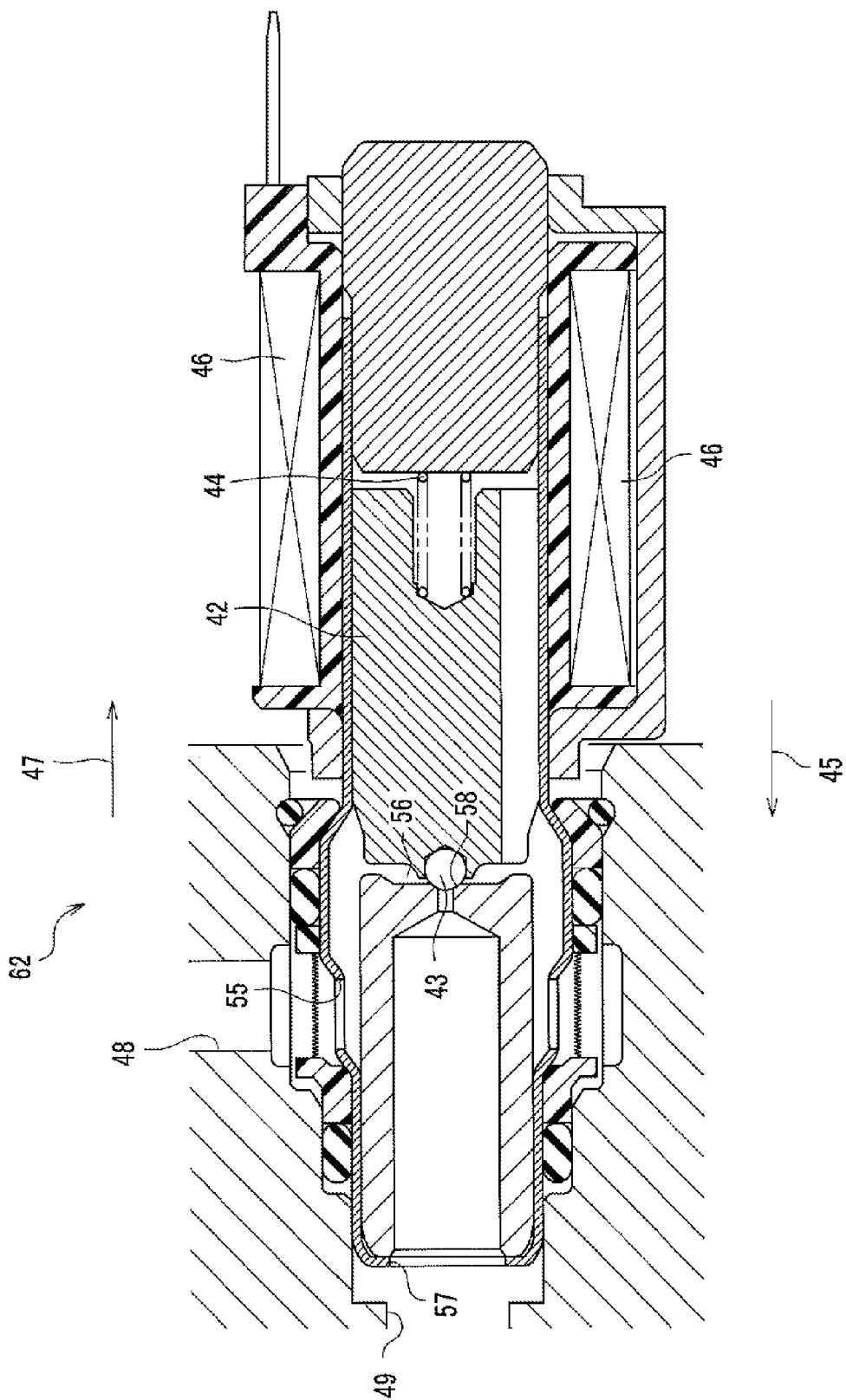
FIG. 2 is a longitudinal sectional view showing a schematic configuration of a third shut-off valve of the braking-force generating system according to the embodiment of the present invention.
Figure 3:
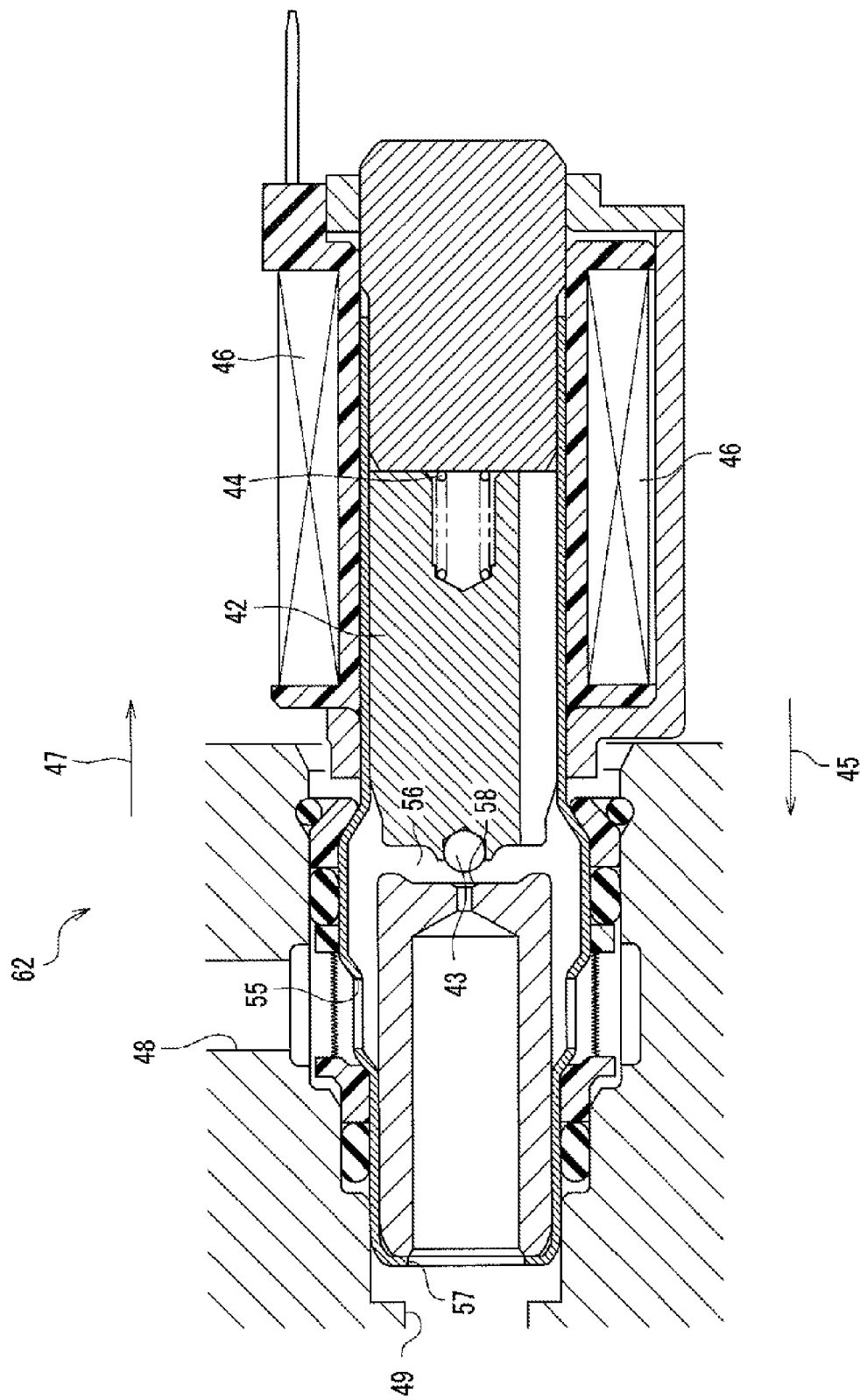
FIG. 3 is a longitudinal sectional view showing a schematic configuration of the third shut-off valve of the braking-force generating system according to the embodiment of the present invention.

FIG. 2 and FIG. 3 are longitudinal sectional views showing schematic configurations of the third shut-off valve 62. FIG. 2 illustrates a closed state of the third shut-off valve 62, and FIG. 3 an open state. The third shut-off valve 62 that includes a solenoid valve is inserted in the intermediate position along the longitudinal direction of the pipe 41.

The third shut-off valve 62 is provided in the interior thereof with a movable core 42 that is able to move in the left-right direction in FIG. 2, a valve element 43 that is provided at a tip of the movable core 42 for opening and closing the third shut-off valve 62. That is, the movable core 42 opens and closes the third shut-off valve 62 by moving back and forth in the direction of an axis thereof. Additionally, the third shut-off valve 62 is provided inside thereof with a spring 44, which biases the movable core 42 in the direction pointed by an arrow 45 in FIG. 2 so as to close the third shut-off valve 62 using the valve element 43. Furthermore, the third shut-off valve 62 is provided with an excitation coil 46 for driving the valve element 43.

In other word, the third shut-off valve 62 is a normally closed valve, and when the excitation coil 46 is not energized and the third shut-off valve 62 is not driven, the spring 44 biases the valve element 43 toward the direction pointed by the arrow 45, and thereby the third shut-off valve 62 is closed. The reference number 58 indicates a valve seat that receives the valve element 43. On the other hand, when the excitation coil 46 is energized, the valve element 43 is moved toward the direction pointed by the arrow 47 in FIG. 2 against the elastic force of the spring 44 by an electromagnetic force, and thereby the third shut-off valve 62 is opened (transitioning from the state of FIG. 2 to FIG. 3).

A passage 48 is connected to the master cylinder 34 through the pipe 41, and the passage 49 is connected to the stroke simulator 64 through the pipe 41. The brake fluid flowing from the master cylinder 34 side sequentially flows into the passage 48, an inlet hole 55, and a valve chamber 56; and flows into the stroke simulator 64 side through an outlet hole 57 and a passage 49 when the valve element 43 moves as illustrated in FIG. 3 to open the third shut-off valve 62. It should be understood that fluid pressure of the brake fluid flowing into the valve chamber 56 becomes pressure acting in the direction in which the valve element 43 is prevented from opening by pressing the movable core 42 from the left side in FIGS. 2 and 3. Note that here is schematically described of only one example of a configuration of the third shut-off valve 62. (The configuration of the third shut-off valve 62 in FIGS. 2 and 3 is well known and an explanation of its detailed configuration is omitted.)

ECU

Figure 4:
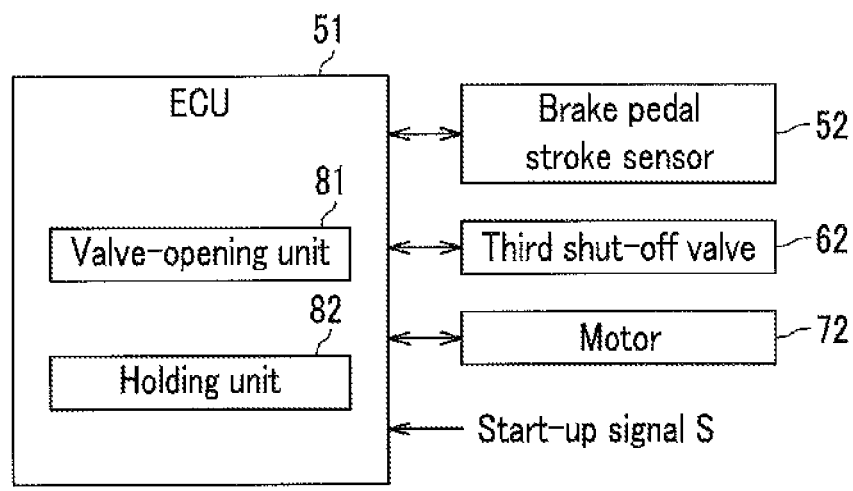
FIG. 4 is a block diagram showing an electrical connection of a control system of the valve system of the braking device according to the embodiment of the present invention.

FIG. 4 is a block diagram showing electrical connections of a control system of the braking-force generating system 10. This control system includes mainly an ECU (Electronic Control Unit) 51 that is a control device including a microcomputer. The ECU 51 is connected with a brake pedal stroke sensor 52 that is a pedal sensing unit for obtaining an operation amount of the brake pedal 12, the third shut-off valve 62 (more specifically, the excitation coil 46 thereof), and a motor 72 of the motor cylinder unit 16 through an interface which is not illustrated.

Additionally, the ECU 51 inputs a start-up signal S indicating that the system is booted by such means as turning on an ignition switch of a vehicle including the braking-force generating system 10.

The ECU 51 is also connected with other actuators and sensors involved with the braking-force generating system 10 because the ECU 51 is a control system of the braking-force generating system 10, but such actuators and sensors are not illustrated because they are not involved with the present embodiment.

The ECU 51 is a controller for controlling the by-wire system described above, and generates a frictional braking force of a vehicle by means of driving the motor 72 to make the motor cylinder unit 16 generate the oil pressure to drive the disk brake mechanisms 30a to 30d (wheel cylinders 32FR, 32RL, 32RR, and 32FL) according to the operation of the brake pedal 12 sensed by the brake pedal stroke sensor 52.

Controlling Third Shut-Off Valve 62

Next, description is given of the valve system of the braking device according to the present embodiment, which controls the third shut-off valve 62 using the ECU 51. The control of the valve system of the braking device is performed by the ECU 51 using a valve-opening operation unit 81 and a holding operation unit 82 that are functions implemented by a control program.

Figure 5:
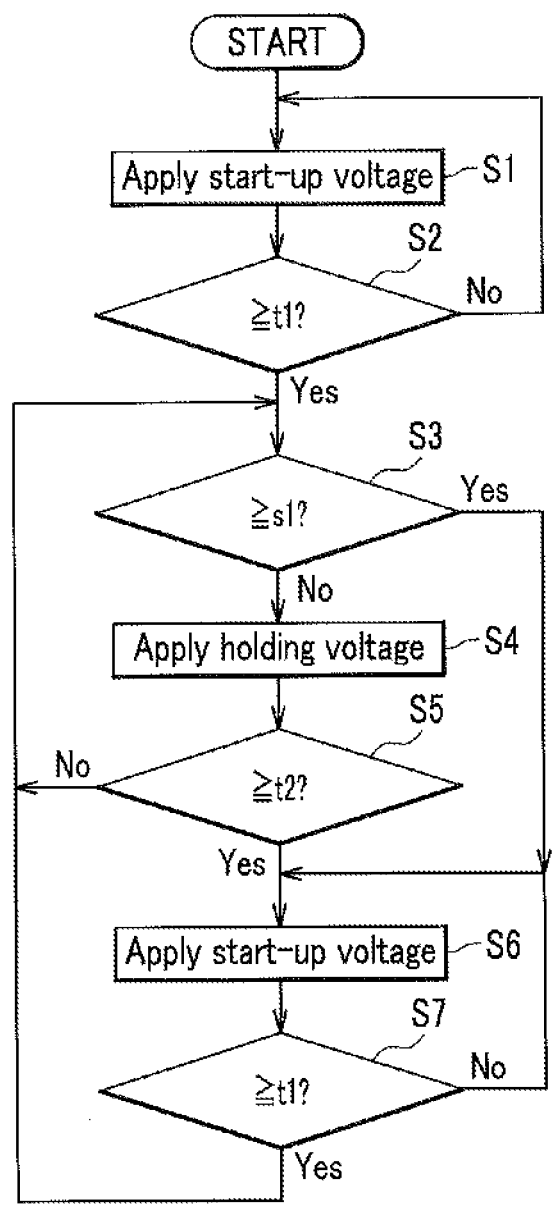
FIG. 5 is a flowchart illustrating a control flow of the valve system of the braking device according to the embodiment of the present invention.

FIG. 5 is a flowchart illustrating the control of the third shut-off valve 62 performed by the ECU 51. First, the ECU 51 receives a start-up signal S indicating that a vehicular system has been started up by turning on an ignition switch of the vehicle or the like; thereby a system boot of the ECU 51 is also performed. The system boot of the ECU 51 makes the ECU 51 start the processing of FIG. 5. In detail, first, the ECU 51 applies a first operating voltage or current (hereinafter referred to as "start-up voltage") on the third shut-off valve 62 (specifically, excitation coil 46 thereof) during a certain period of time t1 (S1, and "No" in S2). The start-up voltage is a voltage that is able to make the valve element 43 of the third shut-off valve 62 move in the direction pointed by the arrow 47 against a biasing force of the spring 44 by being applied during the predetermined period of t1 and to perform the opening operation of the third shut-off valve 62 (performed by the valve-opening unit 81).

Thus, the third shut-off valve 62 is opened ("Yes" in S2), and next, it is determined whether or not the operation amount of the brake pedal 12 obtained by the brake pedal stroke sensor 52 exceeds a predetermined reference value s1 (S3). When the operation amount of the brake pedal 12 is less than the reference value s1 ("No" at S3), the keeping voltage or current (hereinafter referred to as "holding voltage") is applied to the third shut-off valve 62 (excitation coil 46 thereof) during a predetermined period of time t2 (S4, "No" at S5, "No" at S3; performed by the holding operation unit 82). The holding voltage is lower than the start-up voltage described above, therefore is not able to perform the valve-opening operation of the third shut-off valve 62, but is able to keep the open state of the third shut-off valve 62 that has been once opened.

When the holding voltage is applied during the predetermined period of time t2 ("Yes" in S5), then, the second operating voltage or current (hereinafter referred to as the "start-up voltage") is applied to the third shut-off valve 62 (to the excitation coil 46 thereof) during the predetermined period of time t1 (S6 and "No" in S7; performed by the holding operation unit 82). The start-up voltage is similar to that in S1. And, when the application of the start-up voltage during the predetermined period of time t1 is finished ("Yes" in S7), the control returns to step S3.

On the other hand, when it is detected before the predetermined period of time t2 passes ("No" in S5) that the operation amount of the brake pedal 12 obtained by the brake pedal stroke sensor 52 equals or exceeds the predetermined reference value s1 ("Yes" in S3), the process proceeds to the step S6, at which the application of the holding voltage is finished and the start-up voltage is applied during the predetermined period of t1 (performed by the holding operation unit 82) even before the application of the holding voltage during the predetermined period of t2 is completed.

The above process enables to apply the holding voltage and the start-up voltage alternately to the third shut-off valve 62 by performing the steps including and succeeding the step S3 in order to keep the valve-open state after the third shut-off valve 62 is opened by the first application of the start-up voltage during the predetermined period of time t1 (S1, S2).

In this case, when the brake pedal 12 is operated by a driver such that the operation amount becomes equal to or larger than the reference value s1 ("Yes" in S3), the application of the holding voltage is immediately interrupted and the start-up voltage is applied even during the holding voltage is being applied.

In addition, when the system start-up of the ECU 51 is terminated by turning off the ignition switch of the vehicle, or the like, the process illustrated in FIG. 5 is also terminated.

Figure 6:
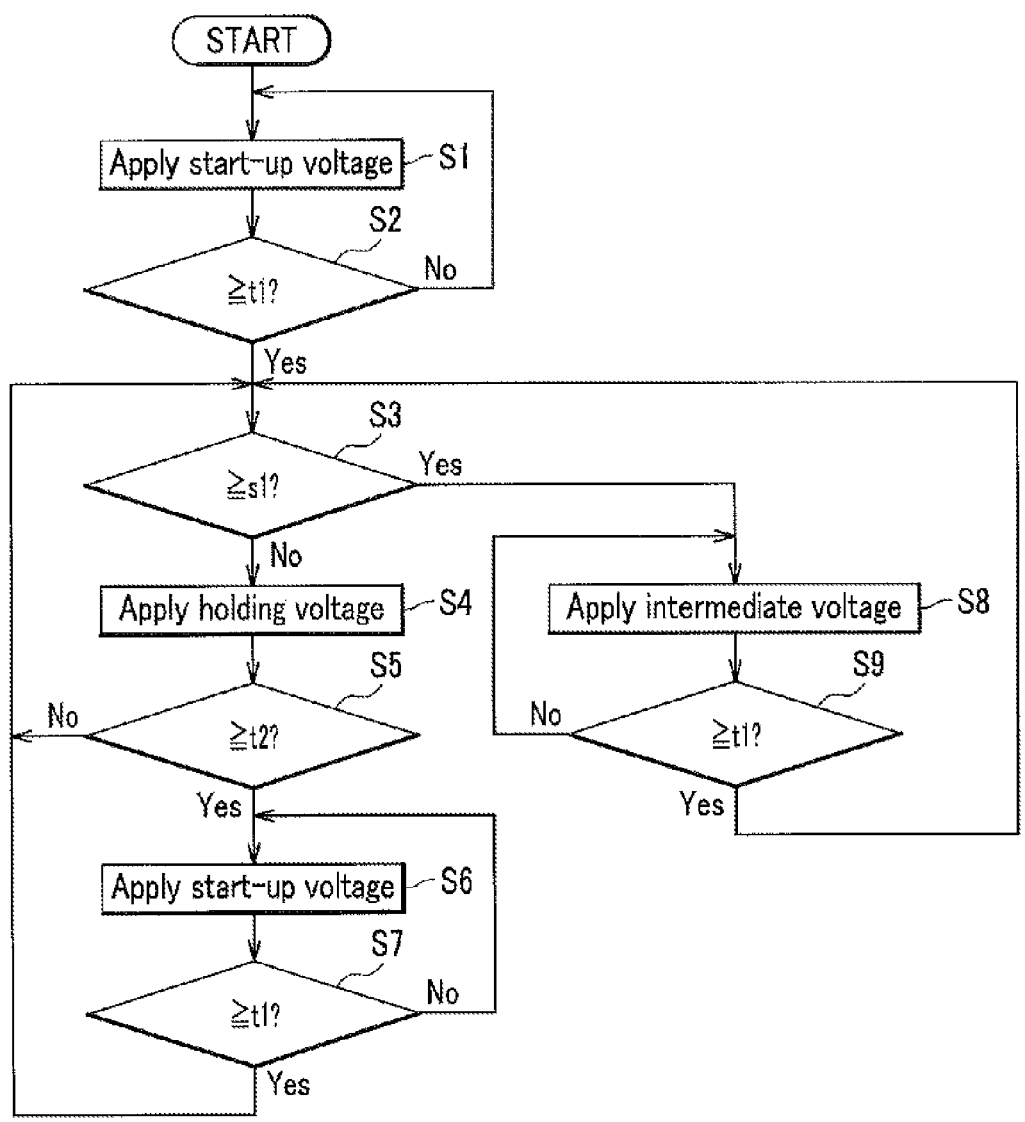
FIG. 6 is a flowchart illustrating another example of the control flow of the valve system of the braking device according to the embodiment of the present invention.

FIG. 6 is a flowchart illustrating another example of the control of the third shut-off valve 62 performed by the ECU 51. In the process illustrated in FIG. 6, because explanations of the steps with the same reference numerals as in FIG. 5 are the same as that in FIG. 5, detailed description thereof is omitted. Steps in FIG. 6 different from FIG. 5 is that the process proceeds to a step S8 instead of the step S6 when the step S3 determines that the operation amount of the brake pedal 12 obtained by the brake pedal stroke sensor 52 equals or exceeds the predetermined reference value s1 ("Yes" in S3). That is, in the step S8, the ECU 51 applies the second operating voltage or current (hereinafter referred to as the "intermediate voltage") to the third shut-off valve 62 (excitation coil 46 thereof) during a predetermined period of time t1 (S8, and "No" in S9). After the application of the intermediate voltage during the predetermined period of time t1 is completed ("Yes" in S9), the process of the ECU 51 returns to the step S3. Here, the intermediate voltage is a voltage lower than the "start-up voltage" that is the first voltage or current and higher than the "holding voltage" that is a keeping voltage or current (detailed is given below).

Figure 7A:
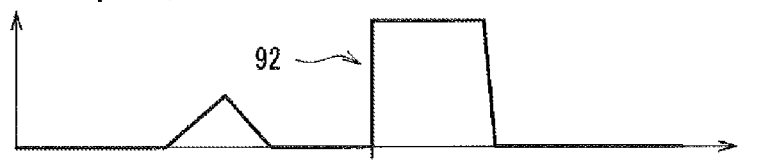
FIGS. 7A-7D are timing charts explaining the control flow of the valve system of the braking device for explaining the processes in FIGS. 5 and 6.
Figure 7B:
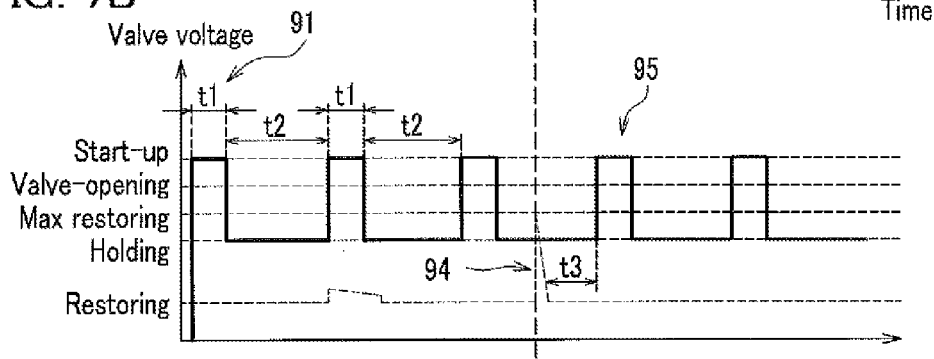
Figure 7C:
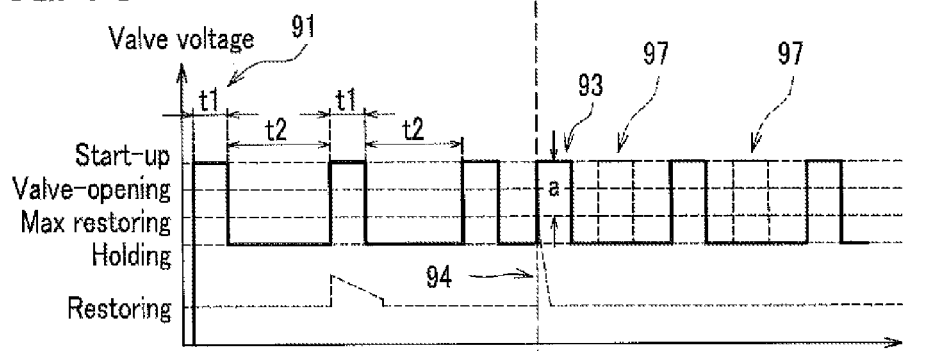
Figure 7D:
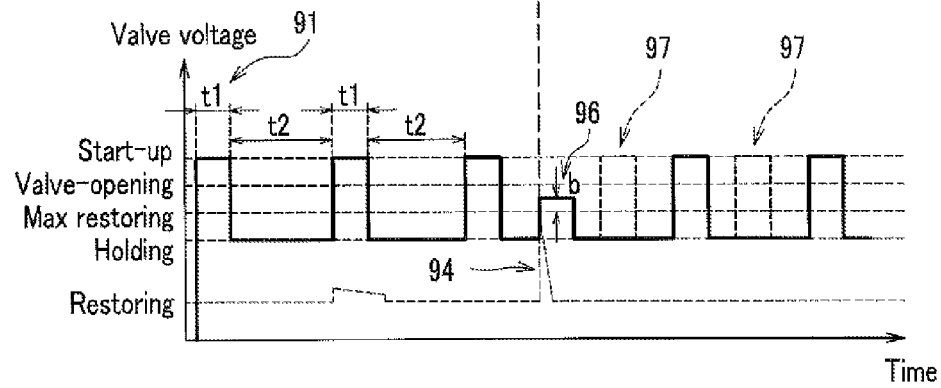

FIGS. 7A to 7D are timing charts for explaining the process in FIGS. 5 and 6. FIG. 7A is a graph showing a change with time of the operation amount of the brake pedal 12, or "the master cylinder pressure" that is a fluid pressure at the master cylinder 34 obtained by the brake pedal stroke sensor 52. FIGS. 7B to 7D show changes with time of the "valve voltage" that is a voltage applied to the third shut-off valve 62 (excitation coil 46 thereof) and respective control examples different from each other. Specifically, FIG. 7C shows a control example in FIG. 5; FIG. 7D shows a control example in FIG. 6; and FIG. 7B shows a modification of FIG. 5. Note that the word "voltage" is omitted in the five terms written at the left side of timing charts for a reason of space limitation in FIGS. 7B to 7D. In the following, adding the word "voltage" to respective tails of these five words, figures are explained. "Restoring voltage" is a valve voltage which if a voltage applied to the excitation coil 46 is equal to or less than, the third shut-off valve 62 changes its state from open to close. The restoring voltage is a value that may vary depending on the amount of the brake fluid flowing from the master cylinder 34 into the third shut-off valve 62 by the operation of the brake, and the possible maximum value thereof is "maximum restoring voltage." "Valve-opening voltage" is a minimum voltage applied to the third shut-off valve 62 (excitation coil 46 thereof) required to open the third shut-off valve 62, and the start-up voltage is set to a voltage somewhat higher than the valve-opening voltage.

First, the start-up signal S indicating the start-up of the vehicular system is inputted, thereby the system start-up of ECU 51 is performed. The system start-up of the ECU 51 starts the process in FIG. 5. Thus, the start-up voltage is applied during the time t1 as indicated by the reference numeral 91 in FIG. 7B (S1 and S2). Thereby, the third shut-off valve 62 is opened. Thereafter, the process in FIG. 5 alternately applies the holding voltage during the time t2 and the start-up voltage during the time t1 to the excitation coil 46. Then, when, as indicated by the reference numeral 92 in FIG. 7A, the operation amount of the brake pedal 12 increases (the master cylinder pressure rises) and the restoring voltage exceeds the holding voltage (FIG. 7C shows an example in which the holding voltage rises up to a maximum restoring voltage like the part indicated by the reference numeral 94), the third shut-off valve 62 is closed. However, the subsequent application of the start-up voltage opens the third shut-off valve 62 again (the reference numeral 93 in FIG. 7C).

In this case, in the process in FIG. 5, as shown by the reference numeral 93 in FIG. 7C, when the operation amount of the brake pedal 12 exceeds the reference value s1 ("Yes" in S3), the application of the holding voltage is interrupted and the start-up voltage is immediately applied ("Yes" in S3 and S6) even during the time t2 of applying the holding voltage. Note that it is desirable to set the restoring voltage to a value that is equal to or higher than the holding voltage.

In contrast, as shown in FIG. 7B, the process in FIG. 5 may always perform alternate applications of the holding voltage during the time t2 and the start-up voltage during the time t1 regardless of whether or not the operation amount of the brake pedal 12 becomes equal to or larger than the reference value s1.

Additionally, in the example of FIG. 7B, it may take a time of t3 until the start-up voltage is applied (shown by the reference numeral 95) to open the third shut-off valve 62, after the restoring voltage exceeds the holding voltage and closes the third shut-off valve 62 (FIG. 7B shows an example in which the restoring voltage rises up to the maximum restoring voltage as indicated by the reference numeral 94). However, in a control example in FIG. 7C, it is possible to prevent the third shut-off valve 62 from being closed by applying the start-up voltage higher than the restoring voltage immediately, even if the operation amount of the brake pedal 12 is increased and the restoring voltage rises up equal to or higher than the holding voltage.

Further, the example of FIG. 6 applies the intermediate voltage that is a voltage of an intermediate magnitude between the start-up voltage and the holding voltage for the time t1 (S3, S8, S9), when the operation amount of the brake pedal 12 becomes equal to or larger than the reference value s1 ("Yes" in S3). It is preferable to set the intermediate voltage to a value exceeding the maximum restoring voltage, i.e., a value exceeding the voltage at which the third shut-off valve 62 is closed, as indicated by the reference numeral 96 in FIG. 7D.

This control example in FIGS. 6 and 7D, similarly to that in FIGS. 5 and 7C, is able to prevent the third shut-off valve 62 from being closed by applying the start-up voltage larger than the restoring voltage immediately even if the operation amount of the brake pedal 12 is increased and the restoring voltage rises up equal to or higher than the holding voltage.

In this case, a margin "b" between the maximum restoring voltage and the intermediate voltage in the control example of FIG. 7D is set to be smaller than a margin "a" between the start-up voltage and the maximum restoring voltage in the control example shown in FIG. 7C.

Therefore, the control example of FIG. 7D is able to suppress the temperature rise of the third shut-off valve 62 better than the control example of FIG. 7C. In particular, in a case in which the operation amount of the brake pedal 12 frequently becomes large, the control example of FIG. 7D demonstrates a significant effect in suppressing the temperature rise of the third shut-off valve 62.

It should be understood that FIGS. 7C and 7D uses fictitious lines indicated by the reference numeral 97 to show the start-up voltage that would have occurred unless the start-up voltages of the reference numeral 93 or the intermediate voltage of the reference numeral 96 would occur in the middle of the time t2 for applying the holding voltage.

Additionally, in the whole control examples of FIGS. 7B to 7D, the ratio of the certain time t1 to the certain time t2 is determined in a range allowable according to a performance of the third shut-off valve 62, that is, a range that the third shut-off valve 62 does not become in a valve stick. In other word, if the certain time of t2 for applying the holding voltage that is a lower voltage comes to be too short and applications of the start-up voltage that is a higher voltage during the certain time of t1 is frequently repeated, the third shut-off valve 62 may become higher in temperature. Thus, the start-up voltage is managed to be applied during the certain time t2 whose ratio to the certain time t1 is determined (preventing the certain time t2 from being too short) so that the generated-heat by the third shut-off valve 62 becomes equal to or less than an allowable predetermined value.

As apparent from the above description, each of the examples of the present embodiment uses the start-up voltage (or the intermediate voltage) and the holding voltage, which are applied to the third shut-off valve 62 alternately in order to keep the open state of the third shut-off valve 62. Thus, each example is able to prevent the third shut-off valve 62 from being closed due to a voltage fluctuation or the like using the start-up voltage, moreover, to prevent the generated-heat by the third shut-off valve 62 from increasing excessively using the holding voltage.

Additionally, as described above, since the start-up voltage and the holding voltage is managed to be applied to the third shut-off valve 62 at the ratio of the certain time t2 to the certain time t1 determined so that the generated-heat by the third shut-off valve 62 becomes equal to or less than the reference value, it is possible to suppress the generated-heat by the third shut-off valve 62 below a predetermined heat amount.

Furthermore, the present embodiment is able to prevent a driver from feeling a discomfort involved in the braking force due to failure of making the stroke simulator 64 generate the braking reaction force because of closing of the third shut-off valve 62 for opening and closing the stroke simulator 64 even during the system is operating after the ignition switch is turned on.

Furthermore, even during the holding voltage is applied, if the brake pedal 12 is operated by an operation amount equal to or larger than the reference value s1 in the middle of the certain time t2 for application of the holding voltage ("Yes" in S3), that is, the fluid pressure at the master cylinder 34 acts in the direction in which the third shut-off valve 62 is closed, there is a possibility that the third shut-off valve 62 is closed. However, in such a case, the present embodiment is able to prevent the third shut-off valve 62 from being closed by applying the start-up voltage (or the intermediate voltage) earlier (S6, S8).

Furthermore, the control example using the intermediate voltage as shown in FIG. 6 and FIG. 7D is able to prevent more effectively the third shut-off valve 62 from rising in the temperature compared to the control examples shown in FIG. 5 and FIG. 7C, because the intermediate voltage is smaller in voltage value than the start-up voltage.

This embodiment shows an example of controlling the third shut-off valve 62 using the voltage, but it is also possible to control the third shut-off valve 62 using a current such as a start-up current (or an intermediate current) and a holding current corresponding respectively to the start-up voltage (or the intermediate voltage) and the holding voltage.

DESCRIPTION OF THE REFERENCE NUMERALS

32FR, 32RL, 32RR, 32FL: wheel cylinder
34: master cylinder

43: valve element
52: brake pedal stroke sensor (pedal sensor)
62: third shut-off valve (valve)
64: stroke simulator
81: valve-opening operation unit
82: holding operation unit

The invention claimed is:

1. A valve system of a braking device comprising:
 a valve that is a normally closed solenoid valve and disposed in a connection passage connected to a liquid flow passage via which a master cylinder communicates with a wheel cylinder;
 a valve-opening operation unit for performing an opening operation of the valve by applying a first operating voltage or current to the valve; and
 a holding operation unit for performing a holding operation of holding an open state of the valve by applying to the valve a holding voltage or current smaller than the first operating voltage or current and a second operating voltage or current larger than the holding voltage or current after the valve-opening operation,
 wherein the master cylinder generates a fluid pressure through an operation applied to a brake pedal; the wheel cylinder generates a frictional braking force through the fluid pressure; and the holding operation unit applies to the valve, alternately, the holding voltage or current for a predetermined time and the second operating voltage or current during the holding operation.

2. The valve system of the braking device according to claim 1, wherein the holding operation unit applies the second operating voltage or current and the holding voltage or current so that heat generated in the valve is equal to or less than a predetermined value during the holding operation.

3. The valve system of the braking device according to claim 2, wherein the holding operation unit may perform an alternate application of the second operating voltage or current and the holding voltage or current so that the heat generated in the valve is equal to or less than a predetermined heat amount during the holding operation.

4. The valve system of the braking device according to claim 1, further comprising a stroke simulator that communicates with the master cylinder via the liquid flow passage and generates a pedal reaction force in the operation applied to the brake pedal,
 wherein the valve is the normally closed solenoid valve provided between the master cylinder and the stroke simulator and have a valve element moving in a direction of closing the valve when the fluid pressure at the master cylinder increases.

5. The valve system of the braking device according to claim 2, further comprising a stroke simulator that communicates with the master cylinder via the liquid flow passage and generates a pedal reaction force in the operation applied to the brake pedal,
 wherein the valve is the normally closed solenoid valve provided between the master cylinder and the stroke simulator and have a valve element moving in a direction of closing the valve when the fluid pressure at the master cylinder increases.

6. The valve system of the braking device according to claim 3, further comprising a stroke simulator that communicates with the master cylinder via the liquid flow passage and generates a pedal reaction force in the operation applied to the brake pedal,
 wherein the valve is the normally closed solenoid valve provided between the master cylinder and the stroke simulator and have a valve element moving in a direction of closing the valve when the fluid pressure at the master cylinder increases.

7. The valve system of the braking device according to claim 4, further comprising a pedal sensing unit for obtaining an operation amount of the brake pedal,
 wherein the holding operation unit applies the second operating voltage or current to the valve at an earlier time if the operation amount of the brake pedal is equal to or larger than a predetermined reference value than otherwise.

8. The valve system of the braking device according to claim 5, further comprising a pedal sensing unit for obtaining an operation amount of the brake pedal,
 wherein the holding operation unit applies the second operating voltage or current to the valve at an earlier time if the operation amount of the brake pedal is equal to or larger than a predetermined reference value than otherwise.

9. The valve system of the braking device according to claim 6, further comprising a pedal sensing unit for obtaining an operation amount of the brake pedal,
 wherein the holding operation unit applies the second operating voltage or current to the valve at an earlier time if the operation amount of the brake pedal is equal to or larger than a predetermined reference value than otherwise.

10. The valve system of the braking device according to claim 7, wherein the second voltage or current is lower than the first voltage or current and higher than the holding voltage or current when the holding operation unit applies the second voltage or current to the valve at the earlier time.

11. The valve system of the braking device according to claim 8, wherein the second voltage or current is lower than the first voltage or current and higher than the holding voltage or current when the holding operation unit applies the second voltage or current to the valve at the earlier time.

12. The valve system of the braking device according to claim 9, wherein the second voltage or current is lower than the first voltage or current and higher than the holding voltage or current when the holding operation unit applies the second voltage or current to the valve at the earlier time.

* * * * *